T. R. RICHMOND.
Grain Drill.
No. {2,660, 33,664.}
Patented Nov. 5, 1861.
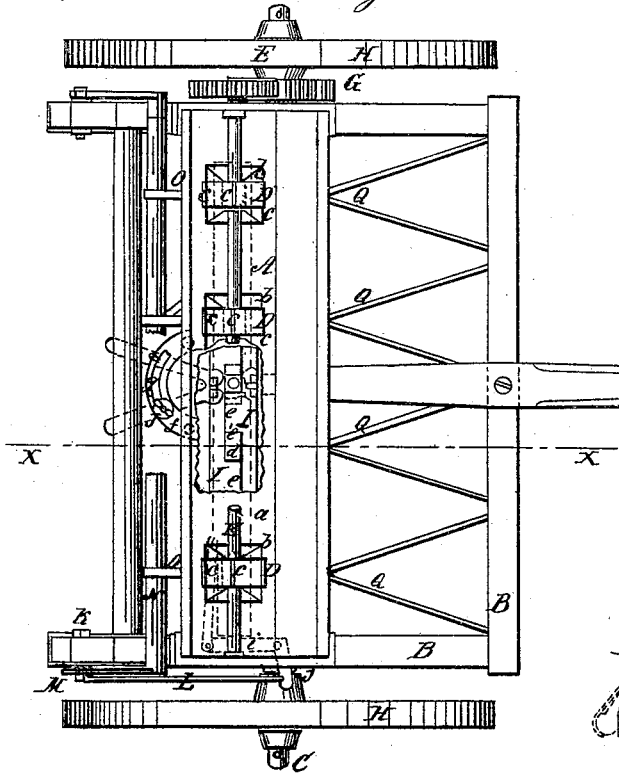
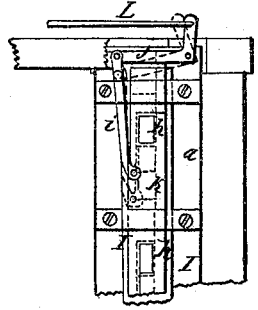
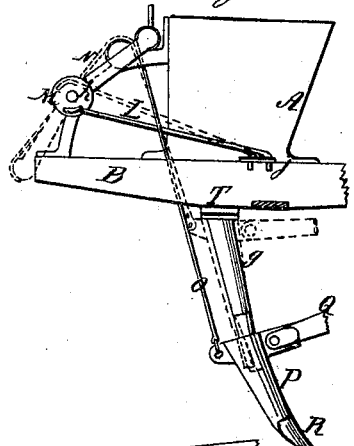
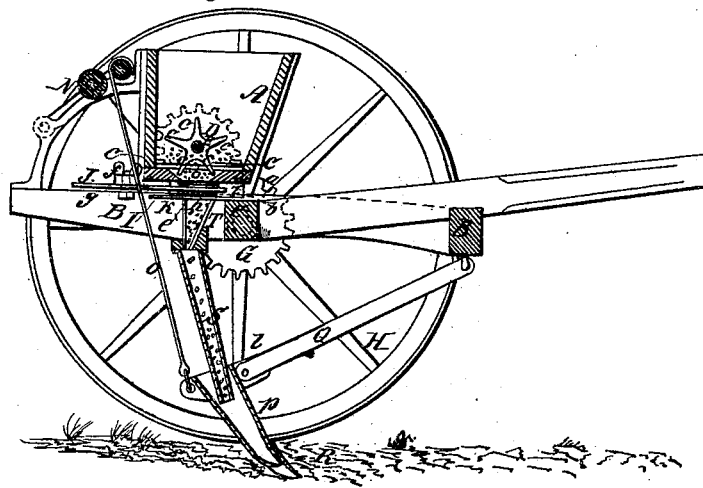
Witnesses:
Inventor:
T. R. Richmond
by Munn & Co
Atty

UNITED STATES PATENT OFFICE.

T. R. RICHMOND, OF MASSILLON, OHIO.

IMPROVEMENT IN SEEDING-MACHINES.

Specification forming part of Letters Patent No. 33,664, dated November 5, 1861.

*To all whom it may concern:*

Be it known that I, T. R. RICHMOND, of Massillon, in the county of Stark and State of Ohio, have invented a new and Improved Seeding-Machine; and I do hereby declare that the following is a full, clear, and exact description of the same, reference being had to the annexed drawings, forming part of this specification, in which—

Figure 1 is a plan or top view of my invention; Fig. 2, a side sectional view of my invention, taken in the line $x\ x$ of Fig. 1; Fig. 3, an inverted plan of the hopper or seed-box, showing the slides by which the discharge of the seed is regulated, and Fig. 4 a side view of a portion of the invention.

Similar letters of reference indicate corresponding parts in the several figures.

To enable those skilled in the art to fully understand and construct my invention, I will proceed to describe it.

A represents a hopper or seed-box, which is placed on a mounted frame, B, parallel with its axle C. The bottom $a$ of the hopper A is perforated at suitable and equal distances apart with holes $b$, the upper edges of which are beveled, and directly over each hole $b$ an agitator, D, is placed. These agitators are formed of radial arms $c$, which are placed on a shaft, E, said shaft running longitudinally through the seed-box, and having a pinion, F, on one end of it, into which pinion a toothed wheel, G, gears, the wheel G being on a hub of one of the wheels H of axle C.

Directly underneath the hopper or seed-box A there are placed two metal slides, I I, which are placed side by side and notched at their adjoining edges, as shown at $d$, the projection $e$ of one slide fitting in the notch $d$ of the other. These notches and projections of the slides form discharge-apertures $e'$ for the seed, and by adjusting these sides, which may be done by actuating a single lever, J, the apertures $e'$ may be enlarged or contracted, as desired.

The lever J may be secured at any desired point by a set-screw, $f$, which passes through a slotted semicircular bar, $g$. (See Fig. 1.)

Directly underneath the slides I I there is placed a slide, K, which is perforated at equal distances apart with holes $h$. This slide K is used as a cut-off to prevent the discharge of seed from the hopper, this result being attained by actuating the slide K, so that its holes $h$ will be out of register with the apertures $e'$ of the slides I I. The slide K is connected to levers $i\ j$, the latter projecting beyond one end of the hopper and connected by a rod, L, to a cam, M, (see Fig. 4,) which is attached to one of the pivots $k$ of a frame, N, behind the hopper or seed-box A.

To the upper part of the frame N there are attached straps O, the lower ends of which are connected to tubes P, the latter being attached by joints $l$ to arms Q, the front ends of which are connected to the front part of the frame B. The lower end of each tube P has a tooth, R, attached. These teeth R form the furrows, and into the upper parts of the tubes P tubes S pass, the latter being stationary and having short tubes T fitting in their upper ends, the upper orifices of the tubes T being in line with the apertures $e'$ of the slides I I.

The operation is as follows: The implement is drawn along in the usual way, and the shaft E is rotated from one of the wheels H by means of the gearing F G. The agitators D as they rotate insure the discharge of the seed from the hopper or seed-box A. The discharge of the seed is regulated by adjusting the slides I I through the medium of the lever J. When the frame N is in a forward position, as shown in Fig. 2, the tubes P are down and form the furrows and the holes $h$ of the slide K are in line with the apertures $e'$, so that the seed may fall into the tubes T. When, however, the distribution of the seed is not required, as in turning at the ends of rows and in transporting the machine from place to place, the frame N is adjusted backward, as shown in red outline in Fig. 4, and the tubes P are thereby raised, and the teeth R will be above the surface of the ground, and at the same time the slide K will be actuated by the levers $i\ j$, so as to cut off the discharge of seed from the apertures $e'$ of the slides I I.

Having thus described my invention, what I claim as new, and desire to secure by Letters Patent, is—

The arrangement of the slotted cam M, pivot $k$, and adjustable frame N with the levers $i\ j$, rod L, slide K, straps O, tubes P, arms Q, and tubes S, all as herein shown and described.

T. R. RICHMOND.

Witnesses:
   C. N. OBERLIN,
   JOHN ALLAN.